Oct. 29, 1929.   T. L. FAWICK   1,733,786
TRANSMISSION
Filed Jan. 21, 1927   5 Sheets-Sheet 2
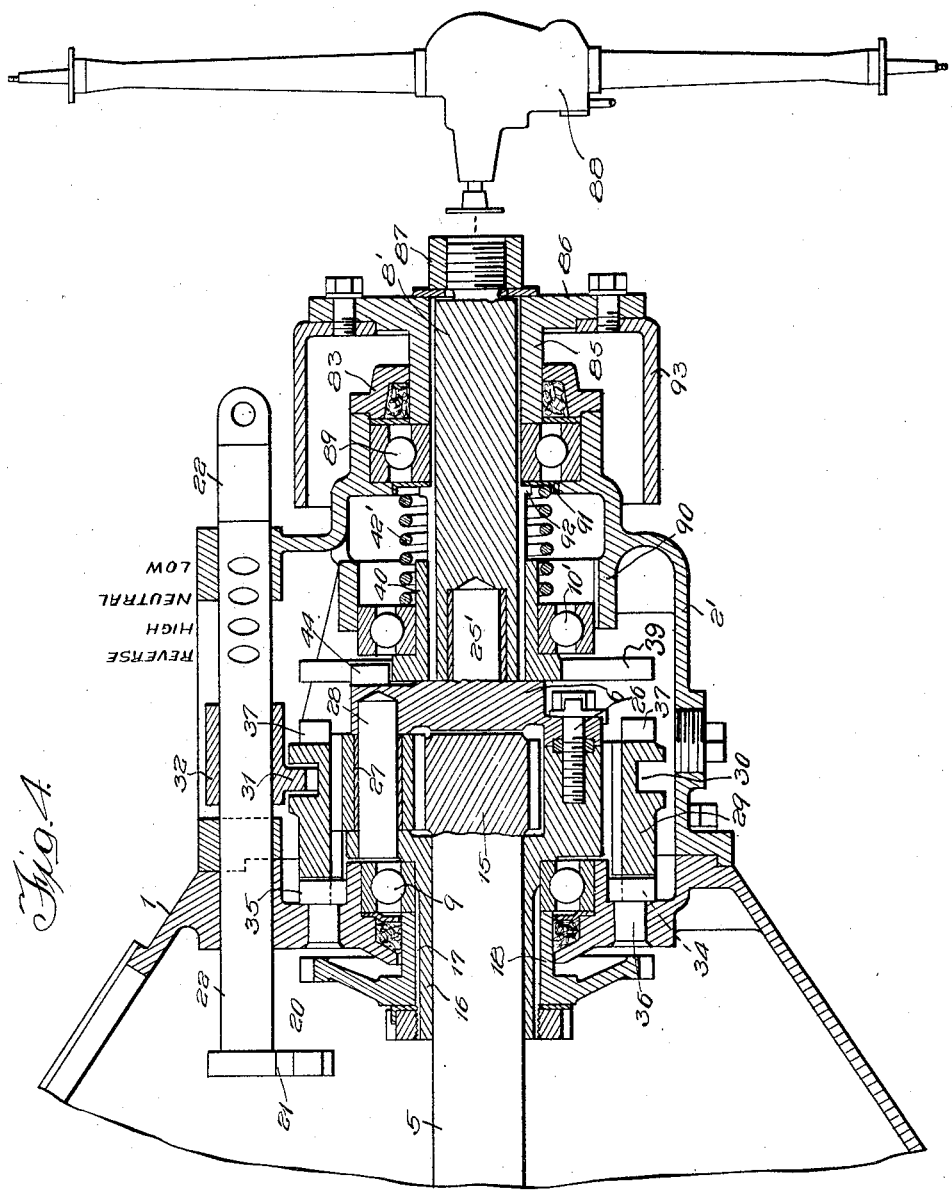
Inventor:
Thomas L. Fawick Oct. 29, 1929. T. L. FAWICK 1,733,786
TRANSMISSION
Filed Jan. 21, 1927   5 Sheets-Sheet 5

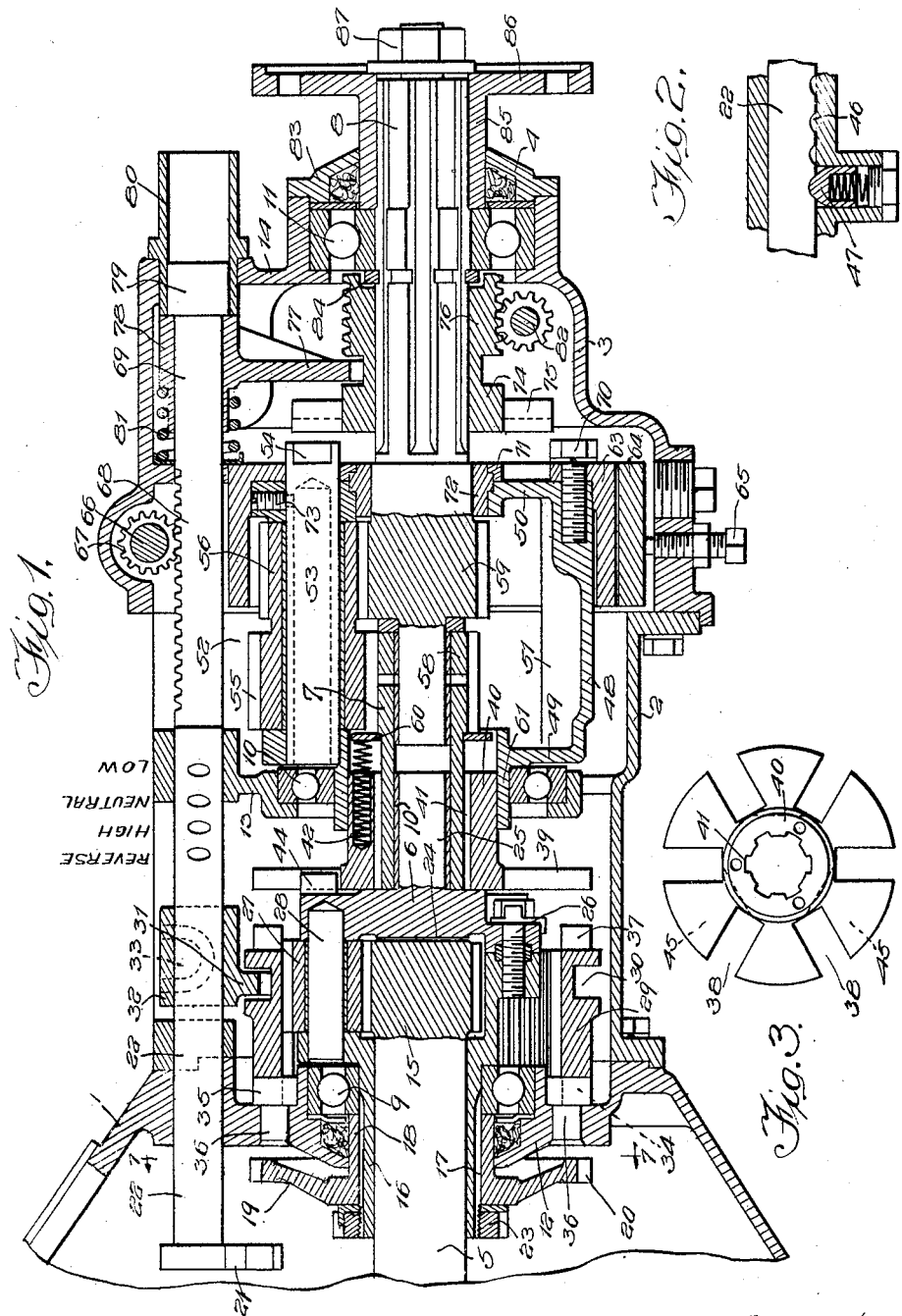

Patented Oct. 29, 1929

1,733,786

UNITED STATES PATENT OFFICE

THOMAS L. FAWICK, OF RACINE, WISCONSIN, ASSIGNOR TO BROWN-LIPE GEAR COMPANY, OF SYRACUSE, NEW YORK, A CORPORATION OF NEW YORK

TRANSMISSION

Application filed January 21, 1927. Serial No. 162,472.

My present invention relates to transmissions for automotive purposes.

The aim of the present invention is, primarily, to provide an improved transmission for use in trucks and like heavy vehicles. In this class of vehicles, it is desirable to give a fairly wide range of speed-torque ratios, and it is desirable also to give a reverse speed which shall not be excessively slow, but, at the same time, to provide a reverse speed which will provide ample torque.

According to the preferred form of the present invention, I arrange two different types of epicyclic gearings in series relation, one of which provides two ratios and a reverse drive, and the other of which provides two ratios. The result of this combination is four direct driving ratios and two reverse driving ratios.

In transmissions of known type used for this purpose, the mechanism becomes exceedingly clumsy and expensive to manufacture and noisy to operate, whereas, the transmission of my invention is light and inexpensive to manufacture, small parts, that is, parts of small diameter and small weight being employed throughout. At the same time, ample strength is provided and quietness and long life are secured.

Another objection to transmissions of the prior art is the matter of continuously driving idle gears even when on direct drive. Such idling gears consume power and cause noise. According to my present invention no idle gears continue to be driven when drive is direct, the epicyclic gears and the central pinions being clutched together and rotating as a unit. This is true in each epicyclic train. Hence there is a minimum of noise and power loss.

The transmission is easy to operate and a single operating lever or handle is preferably provided for controlling the same, although two operating levers or handles may be employed, if preferred.

Now it is to be understood that while the preferred form, i. e., the combination of the two epicyclic gear sets, is particularly useful for heavy duty the invention is not to be limited to this duty.

Each of the epicyclic gearings, which are combined in the preferred form of the invention, is individually novel and independently useful. For example, the first transmission which includes the reverse high and low, may be used in connection with the rear axle construction shown in my prior application Serial No. 152,537, filed December 4, 1926, in which a ratio changing gear mechanism is mounted in or on the rear axle. Likewise, the second transmission, which comprises merely a ratio changing mechanism, may be employed in series with a standard transmission of the planetary or shifting gear type as is disclosed in my co-pending application Serial No. 129,308, filed August 16, 1926.

Now in order to acquaint those skilled in the art with the manner of constructing the device embodying my invention, I shall describe in connection with the accompanying drawings a specific embodiment of the same.

In the drawings:—

Fig. 1 is a substantially vertical longitudinal section through the preferred form of transmission;

Fig. 2 is a fragmentary detail sectional view;

Fig. 3 is an end view of the shiftable clutch plate;

Fig. 4 is a vertical section of a modified transmission of my invention;

Figure 5:
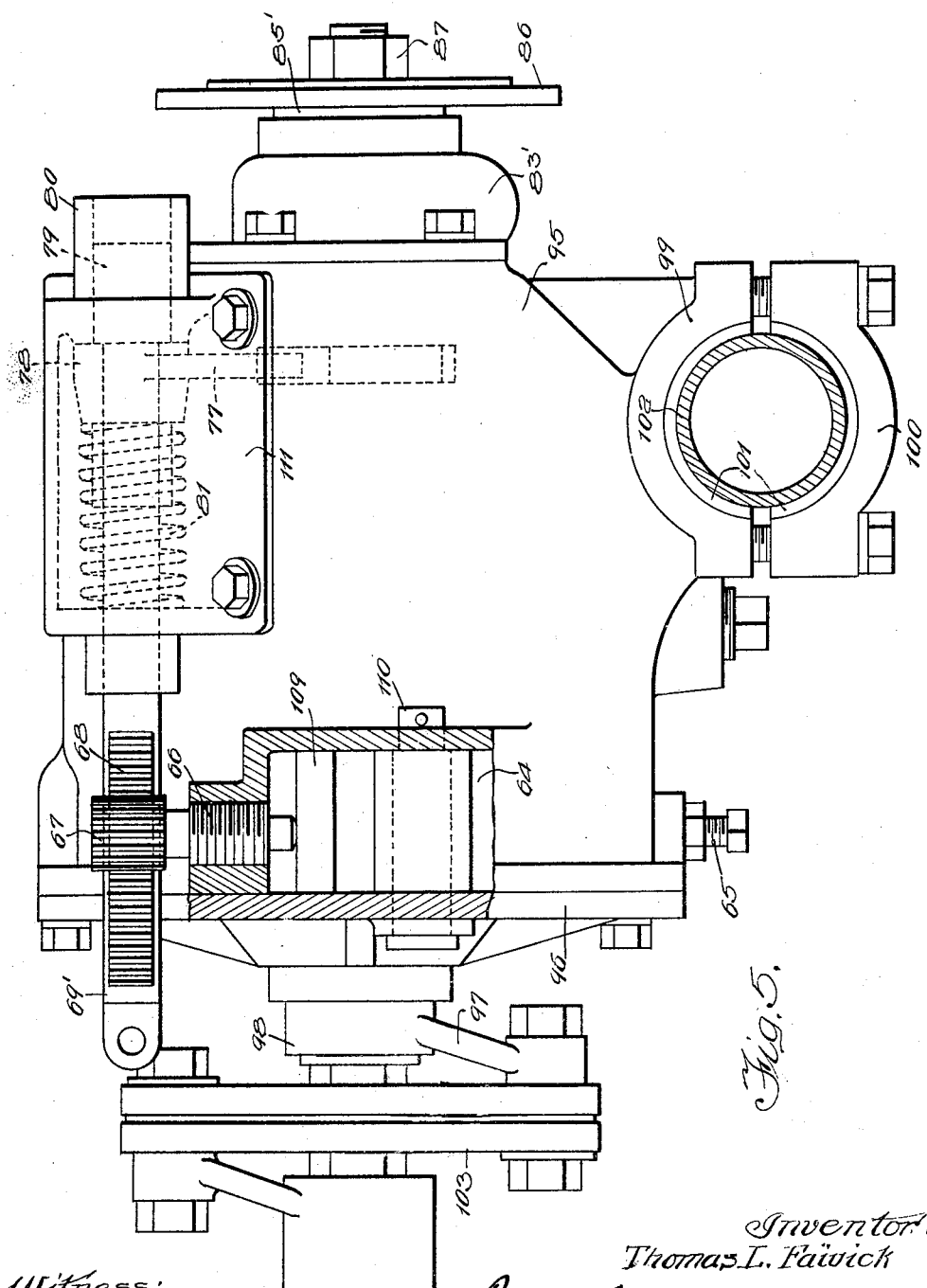
Fig. 5 is a side elevational view of another form of the transmission of my invention.

Referring now to the transmission shown in Fig. 1, I provide a frame and housing made up in three sections; first, the bell housing 1 which may be bolted to the fly wheel and clutch housing of the driving motor; next, an intermediate housing member 2 and an end member 3. These housing sections are suitably bolted together by companion flanges piloted on each other to secure registration.

While within the broad scope of my invention the drive through the transmission may be from either direction, and as a matter of fact, is through the same in both directions in the normal operation of the vehicle, the shaft 5 is herein termed "the driving shaft", at least with respect to the first epicyclic transmission. It is to be understood that the terms "driving" and "driven" as applied to the parts herein are explanatory and not limiting. This shaft is preferably connected to the clutch of the driving engine. The next element in the line of drive from the driving shaft 5 to the driven shaft, which may be a propeller shaft or even a rear axle shaft, is the cage member 6. The next element in the line of drive is the shaft or shaft section 7, and then the final driven shaft or shaft section 8. The shaft section 7 is, with respect to the driving shaft 5, a driven shaft, and with respect to the final driven shaft 8, it is a driving shaft. All of these elements in the line of drive are aligned with each other and piloted on or in each other so as to provide radial support for the entire line of drive throughout. The support which this line of drive secures from the frame or housing is provided in three simple relatively small bearings, namely, the front bearing 9, the intermediate bearing 10 and the rear bearing 11. These bearings are preferably ball bearings, so that they may take whatever endwise thrust might result from operation of the device.

To support these three bearings the housing or frame contains walls or webs 12, 13 and 14, respectively.

All of the wearing parts are contained between walls or webs 12 and 14 and the space between these walls or webs comprises a lubricant container, open channels being formed through the lower part of web or wall 13.

The driving shaft 5 has a pinion formed on the rear end thereof and this pinion is embraced by the cage 6.

The cage 6 is formed in two parts, the front part comprising a sleeve 16 fitting upon the cylindrical part of the shaft 5 adjacent the pinion 15 and having a suitable bearing thereupon. This sleeve is splined as indicated at 17 to receive the hub 18 of the clutch disc 19, the periphery of which is provided with gear teeth 20 serving as clutch dogs to cooperate with the internal gear segment 21 mounted on the shifter rod 22 and serving as a clutch member or detent. The shifter rod 22 is not subjected to torque as the form of detent 21 eliminates this.

The hub of the clutch disc 19 is held in place by a lock nut 23 which also binds the inner race of the bearing 9 in place upon sleeve 16 of cage 6. While for the sake of compactness the clutch disk 19 lies on the outside of the bearing 9 this is not essential as it may lie on the inside and the clutch dog 21 may then play between the disk 19 and the ring gear 29, to clutch either one. The other part of the cage 6 comprises a disc or plate 24 having an axially projecting bearing pin 25 which is piloted in a bearing in the intermediate shaft 7. This pin 25 has bearing support in bearing 10.

The two halves of the cage are suitably bolted together by screws 26 preferably at three points between the idler gears 27, these idler gears 27 being preferably equally spaced and three in number. The idler gears are mounted on bearing pins 28 seated in the plate 24 and on lugs in the first part of the cage. The idlers 27 are arranged at 120 degrees about the pinion 15, and are always in mesh with the pinion. Thus at least three full teeth are always in mesh giving exceptional strength.

Upon the outside of and in mesh with the three idler pinions 27 there is an internal ring gear 29, the teeth on this ring gear being wide enough axially to permit the gear to be shifted axially to perform certain clutch operations as will be explained later, without losing mesh with the idlers 27. As will be apparent later the gear may be so made as not to require shifting of the ring gear by shifting of the clutches relative thereto. The ring gear 29 is provided with a shifter groove 30 in which rests a shifter fork 31, this shifter fork having a hub or shank 32 pinned upon the shifter rod 22 and the said hub or shank being provided with a suitable socket 33 to receive the end of a shift lever, as is well understood by those skilled in the art.

The front end, that is to the left in Fig. 1 of the ring gear 29 bears a series of clutch dogs 34, these clutch dogs being at least three in number and cooperating with clutch pins 35, these clutch pins 35 being held in the web 12 by cylindrical shanks 36 riveted in holes in said web 12.

If desired the clutch pins may be mounted resiliently with respect to frame or web 12 as is disclosed in my copending application above referred to so as to relieve the shock of clutching while the parts are in motion.

The rear end of the ring gear 29 has a series of clutch dogs or teeth 37 preferably three in number, arranged to engage in suitable notches or sockets 38 in the clutch disc 39, which clutch disc is axially shiftable upon but feathered to the intermediate shaft 7. The clutch disc 39 has a hub 40 which is splined upon the intermediate shaft section as indicated at 41. A series of three or more springs 42, seated in longitudinally extending holes in the hub 40, push the clutch plate normally to the left where the sockets or notches 38 engage the clutch dogs or projections 44 on the cage member 6. Preferably the clutch notches or sockets 38 are provided with entering depressions 45, cut to about one-half the depth of the web of plate 39 between successive pairs of notches 38 so as to facilitate entry of the clutch lugs or dogs 34 into the notches 38, and also to assist the entry of the clutch dogs 37 into the same notches 38. Obviously, instead of having the notches in the plate 39 and the projections on the cage and on the ring gear, the relation may be reversed. The clutch plate instead of being spring pressed may be independently shiftable.

Instead of piloting the cage 6 in the intermediate shaft section 7, the relation may be reversed.

The epicyclic gear thus far described permits of a reverse drive when the cage 6 is held stationary and the ring gear 29 clutched to the clutch disc 39 on the intermediate shaft section 7. It permits of a low driving ratio when the ring gear 29 is clutched to the frame and the drive is through the cage to the clutch disc 39 and the intermediate shaft section 7. It permits of a direct drive when the ring gear 29 and the cage 6 are both clutched to the clutch disc 39 and thereby to the intermediate shaft section 7. The shifter rod 22 is provided with a series of notches, as indicated in Fig. 1, and these notches engage with a round nosed spring pressed plunger 47 shown in detail in Fig. 2.

The second epicyclic gear comprises a cage member 48 having end wall plates 49 and 50 joined preferably by three webs, such as 51, and between these webs 51 there are located the compound gears 52. These compound gears 52 are three in number journaled on bearing pins 53, the ends of which project from the cage and are slabbed off, as indicated at 54 to form clutch dogs. Preferably there are three pins 53 with their compound idlers 52. Each of the compound gears 52 comprises a gear 55 and a gear 56, the latter preferably being of a smaller diameter than the former. The intermediate shaft section 7 bears an integral pinion 58 which is embraced by and meshes with the three gears 55. In like manner, the driving shaft 8 has an integral pinion 59 which is embraced by and meshes with the idler gears 56. The shaft 8 is reduced and extended within the hollow shaft section 7 to pilot these two parts together. Obviously, the piloting might be reversed.

The springs 42 which push the clutch disc 39 to the left, as viewed in Fig. 1, are prevented from interfering with the teeth of the pinion 58 by means of a thin plate or washer 60 bearing against the ends of the teeth of the pinion 58.

Since considerable drive may occur through the gear ratio provided by this second transmission, I provide bearing bushings and spacing rings of anti-friction metal at suitable points to reduce wear.

The cage 48 has an extending sleeve 61 bearing on the hub 40 of the clutch disc 39. This bearing may be loose or it may be close enough to take whatever slight radial load there is between the clutch plate 39 and the cooperating clutch parts. It is to be noted, however, that the pinion 58 is supported at three equidistant points by the idler gears 55 at its rear end and that it is piloted onto the extension 25 of the cage 6, which cage has first a bearing on the pinion 15 at three equidistant points and, next, which is supported in the ball bearing 9.

This extending sleeve 61 of the cage 48 is supported in the inner race of the ball bearing 10. As a result, this end of the cage is borne directly by the housing or frame just as the forward end of cage 6 is supported.

At its opposite end, the cage 48 is provided with a drum member 63 which is adapted to be embraced by and engaged by a solid metal brake strap or band 64 of the type disclosed in my co-pending application above referred to. That is to say, this is a solid metal spring band which is carefully machined out to a diameter slightly larger than the brake drum 63 and which is held concentric by the adjustable stop formed by the stop screw 65. This band is adapted to be contracted by a screw pin 66 threaded against a lug on the end of the band, as will be apparent from the showing of Figs. 5 and 6, the screw pin 66 being actuated by pinion 67 meshing with a rack 68 on the second shifter rod 69.

The brake drum 63 is secured to the cage 48 by cap screws 70 and this drum has flange 71 extending inward radially for clamping a bearing sleeve 72 of anti-friction metal in a suitable socket formed partly in the flange 71 and partly in the web or wall 50.

The bearing pins 53 are preferably hollowed out to lighten the same and are held in place by screw pins 73 overhung by the brake drum 63.

The driven shaft 8 is splined from adjacent the bearing 72 to its rear end. A clutch plate or disc 74 having a series of notches 75 therein has a hub 76 splined to cooperate with the splines on the shaft. A suitable shifter fork 77 lying in a groove in the hub 76 is adapted to shift the clutch plate 74 into or out of engagement with the ends 54 of the pins 53. This clutch plate is provided with entering recesses like plate 39.

This shifter fork 77 has a hub 78 loosely mounted on the shank of the shifter rod 69. The shifter rod 69 has a head 79 guided in a suitable guide 80 which may be an extension on the rear end of the housing portion 3, and this hub is engaged by a compression spring 81 held on a sleeve extension of said hub which spring normally forces the shifter fork 77 to the right as indicated in Fig. 1 against the end of the tubular guide 80. The shifter rod 69 is free to move further to the right in the guide 80 so as to turn the pinion 67 to a desired extent to tighten the clutch band 64 after the shifter fork 77 has been moved to its extreme right position. This is to permit take-up due to wear and to permit as great a force as may be required to be applied to the band 64 to cause it to grip drum 63.

The rear end of the hub 76 of the shifter plate 74 is provided with a worm for driving the speedometer shaft worm wheel 82 whether in clutching or declutching position.

The outer race of the bearing 11 is held between a flange in the wall 14 and a cap member 83 which is suitably bolted in place.

The inner race of the bearing 11 is held between a split ring 84 set in a notch in the shaft 8, and the hub 85 of the companion driving flange 86 which may be connected through a suitable joint, flexible or otherwise, to a propeller shaft or the like. This flange member 86 is held to the splined shaft 8 by means of the nut 87 threaded on a reduced extension of the shaft 8.

It will be apparent to those skilled in the art that instead of shifting the clutch disc 74 the pins 54 or similar pins might be shifted, as is disclosed in my copending application above referred to.

It is also apparent to those skilled in the art that it is within the spirit and scope of my invention to provide any other suitable means for holding the disc 19 against rotation. I have shown this element in its simplest form for the sake of clarity.

In the first gear set the small gears 27 are mere idlers transmitting motion from pinion 15 through themselves to the ring gear 29. In the second gear set the compound gears 52 really comprise lay shafts as they comprise gears 55 driven by pinion 59 transmitting motion axially to the integral gears 56 and these in turn meshing with driven pinion 59.

The operation of the device thus far described is as follows:—

With the parts in the position shown, the ring gear 29 is clutched to the frame, the cage 6 is clutched to the intermediate shaft section 7, the cage 48 is clutched to the frame by means of band 64 with the result that drive through the first gear set is low in forward direction and is reduced in the second gear set. The shifter rod 22 may now be shifted to neutral, whereupon the jaws 34 on the end of the ring gear 29 become disengaged from the clutch pins 35 on the frame, and then, since the ring gear is free, drive is interrupted. Further movement of the shifter rod 22 to the right results in engagement of the teeth 37 with the notches 38 so that the ring gear 29 is then clutched to the intermediate shaft section and the cage 6 is also clutched thereto with the result that the drive is direct from the shaft 5 to shaft 7, that is, at a 1 to 1 ratio, the entire ring gear and cage rotating as a unit. Further movement of the shifter rod to the right presses the clutch plate 39 away from the teeth or dogs 44 of the cage 6, freeing the same and thereby passing through a neutral position, and immediately thereafter the holding dog 21 engages the teeth 20 on the clutch disc 19, holding the cage stationary and the drive proceeds from the pinion 15 through the idlers 27 which rotate on the stationary pins 28 driving the ring gear and the clutch disc 39 and shaft 7 in the reverse direction. The drive is thereby reversed.

It will be understood that these shifts of the rod 22 are preferably accompanied by disengagement of the driving clutch, as is the case in the usual change gear transmission.

If it is desired at any time during any of these changes to shift from the low ratio to the higher ratio in the second gear set, it is necessary merely to move the shifter rod 69 to the left, as viewed in Fig. 1, said movement resulting in the rack 68 turning the pinion 67 and releasing the clutch band 64 from the drum 63, permitting the same to be freed from the frame, and substantially simultaneous with the release of the drum the clutch dogs 75 and 54 are engaged, resulting in coupling of the intermediate shaft section 7 with the driven shaft 8.

The shifting of the second gear set does not require disengagement of the driving clutch.

The driving ratios which are secured in the transmission above described are as follows:—

For low drive, as shown in Fig. 1, the ratio of engine to propeller shaft speed, that is, shaft 5 to shaft 8, is 5.36 turns to 1. The second ratio which may be secured by low drive through the first set and direct through the second is 3.43 turns of the shaft 5 to 1 of the shaft 8. The third ratio which may be secured by direct drive through the first set and reduced drive of the second set, is 1.55 turns of the shaft 5 to 1 of the shaft 8, and the fourth ratio is a straight through 1 to 1 drive.

On reverse drive with the second gear set in low ratio, the reverse drive is of a ratio of 4.8 turns of the shaft 5 to 1 turn of the shaft 8, and on reverse drive with the second gear set in direct, the ratio is 2.43 turns of the shaft 5 to 1 turn of the shaft 8.

Now, as I have above indicated, each one of the gear sets is individually new and useful, as well as being useful in the above described combination.

Referring now to Fig. 4, in which I have shown the first gear set as comprising a transmission directly coupled to the clutch shaft 5, the final drive shaft 8' is coupled to the two speed rear axle indicated diagrammatically at 88 in Fig. 4.

The construction of the pinion 15, idlers 27, cage 6, with the various clutching mechanisms, is substantially the same as shown in the first set in Fig. 5. The cage 6 is piloted in the driven shaft 8' by a short pilot 25'.

The clutch plate 39 is splined upon the driven shaft 8', but it carries with it the bearing 10' on its hub 40, the outer race of this bearing being supported in a circular flange or housing 90 forming a part of the wall of the frame or gear cage 2'. It will be apparent that this bearing may be stationary and the clutch plate only shiftable.

The bearing 10' and the clutch disc 39 are pushed to the left by the spring 42', which spring bears at its rear end against a plate 91, the plate being clamped between the inner race of the bearings 89 and a flange 92 formed on said shaft 8'. The outer race of the bearing 10' is free to slide endwise in said cylindrical bearing supporting ring 90. The companion flange of a joint, universal, or otherwise, is shown at 86 and the hub 85 thereof is pressed against the inner race of the bearing 89 by the nut 87 which is threaded on the reduced extension of the shaft 8'. The outer race of the bearing 89 is held by the cap 83 which is suitably bolted in place. A transmission brake drum 93 is secured to the companion flange 86.

The operation of this gear set is coordinated with the change gears in the rear axle 88 so as to secure four direct driving ratios and two reverse driving ratios as previously described. That is to say, the second gear set is here mounted in the rear axle, or on the same, and the two drives in series secure the same general results heretofore described, although it is to be noted that, due to the differential action in the rear axle, the ratios are not the same. This, however, is a matter of choice. Obviously the transmission shown in Fig. 4 may be used without the change gears in the rear axle.

Figure 6:
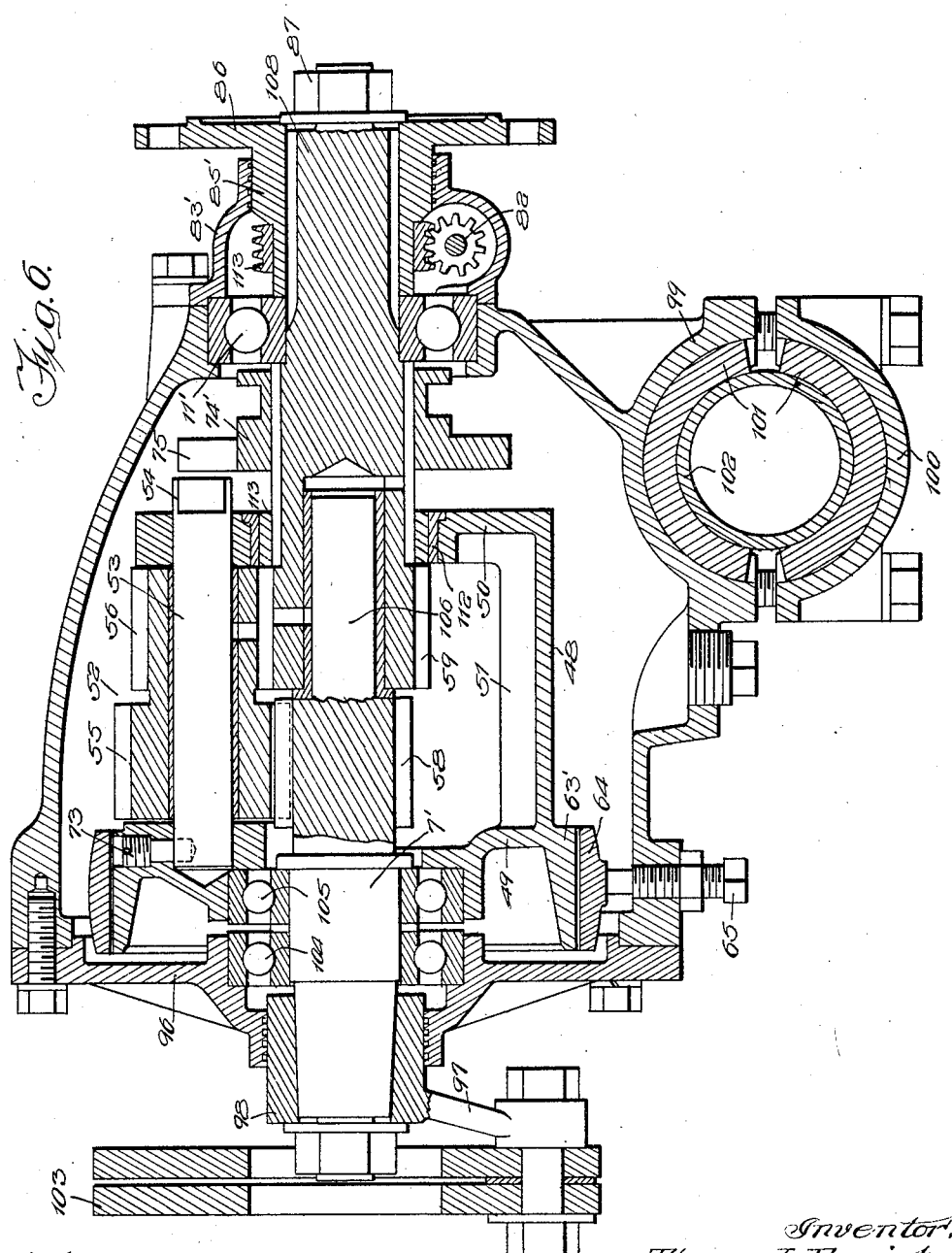
Fig. 6 is a vertical sectional view of the same.
Figure 7:
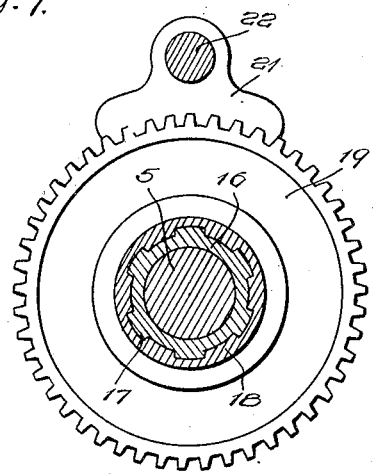
Fig. 7 is an end view of the clutch plate and shiftable detent for clutching the cage to the stationary frame.

Referring now to the gear set shown in Figs. 5 and 6, it is to be observed that this gear set is preferably an auxiliary gear connected back of the regular transmission either planetary or sliding gear, or the like. In this case, the driving shaft 7' is provided at its forward end with a spider 97 by which it is connected through a universal or flexible joint in the line of drive toward the propeller shaft. The hub of this spider is clamped on the tapered end of the driving shaft section 7'. The set is mounted in a case 95 having a suitable front cover 96 and a rear cap 83'. This case 95 is provided with a wide saddle or seat 99 and clamping cap 100 within which there is compressed a rubber or fabric liner 101, preferably in two semi-cylindrical sections, to grip a cross frame member 102 preferably in the form of a tubular brace. Thus, by means of the rubber or fabric liner 101 and the flexible coupling 103, the set is insulated from the frame against transmission of noise or vibration.

The driving flange 86 at the rear is connected to a suitable universal or flexible joint member and thence to the propeller shaft.

The cap member 96 provides a separate bearing 104 for the shaft 7' in the frame or housing, and a second bearing 105 is interposed between the shaft section 7' and the forward end of the gear cage 48. At its rear the shaft section 7' bears the pinion 58 which is in mesh with the three gears 55 of the compound idler gears 52 and the shaft 7' has a reduced extension 106 piloted in the forward end of the driven shaft 108.

These compound idlers 52 are mounted on pins 53 as previously described, the rear ends of the pins projecting out and forming dogs 54 adapted to cooperate with the notches 75 in the clutch plate 74' which is shifted by means of the shifter fork 77 mounted on the rod 69'. This shifter rod has the rack teeth 68 cooperating with the pinion 67 to turn the threaded pin 66 down against the lug 109 of the band 64, the opposite end of said band being pivotally supported on the pin 110 which is mounted in the lateral extension of the housing 95 and the cover 96.

The rear end of the rod 69' and the spring 81, with the hub 78 of the fork 77, are mounted in an auxiliary housing 111 bolted at the upper side of the main housing 95.

The rear wall 50 of the cage 48 is provided with a liner 112 which is pressed into an opening in said rear wall and which liner 112 is preferably made of anti-friction material bearing upon a bearing ring 113 mounted on the splines on the shaft 108. This part of the shaft 108 may be left unsplined to provide a bearing for the cage. Obviously, an anti-friction bearing may be provided at this point.

The speedometer drive in this instance is provided by a worm 113 mounted on or formed on the hub of the driving flange 86 and it cooperates with the worm wheel 82. This worm wheel then leads to the speedometer. The compound gears 52 have the integral gear portions 56 and the three gear portions 56 bear upon and are meshed with the driven pinion 59 as in the case of the structure shown in Fig. 1.

The construction and operation of the device shown in Fig. 5 and Fig. 6 is otherwise the same in structure and operation as the second set disclosed in Fig. 1. Movement of the shifter rod 69 to the right, as viewed in Fig. 5, releases the clutch plate 75 from the dogs 54 so that the cage is not held to the driven shaft 108 and, at the same time, contracts the band 64 upon the integral drum portion 63 formed on the cage 48. Thereupon the drive proceeds from the shaft 7' through the pinion 58, the three idler gear portions 55 and the companion idler gear portions 56 to the pinion 59 and thence to the driven shaft 108.

Upon movement of the shifter rod 69' to the right, the band 64 is first released and thereupon the clutch disc 75 is let into engagement with the jaws 54 to hold the cage. The lost motion connection which is provided by the enlarged head 79 engaging the rear end of the hub 78 of the shifter fork 77 permits of a take-up due to wear of the band or drum, and also it permits operation of one of the clutch devices before or after the operation of the cooperating clutch device.

Figure 8:
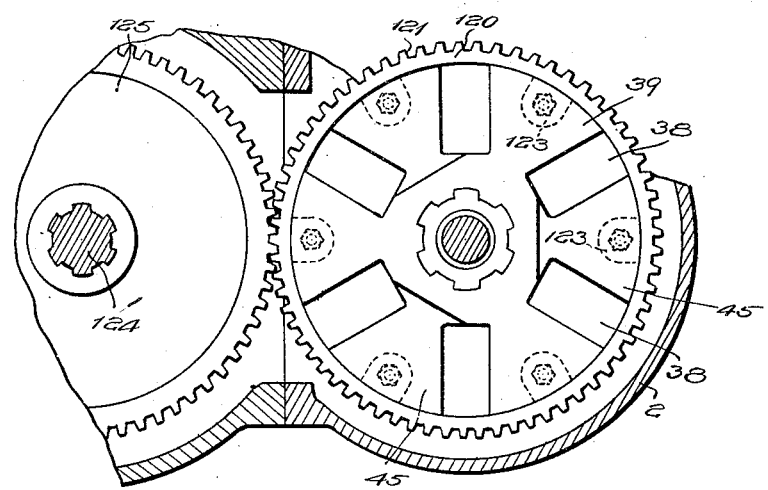
Fig. 8 is a fragmentary sectional view showing the manner of providing a power take off at the rear end of the first epicyclic gear set.

In Fig. 8 I have shown an arrangement for a power take off back of the first gear set. A supplementary case 122 is bolted to the side of case 2, apertures in the sides of said cases registering and permitting meshing of the necessary parts.

Upon the rim of clutch plate 39 I bolt a ring gear 120 having external spur gear teeth 121. The ring gear has inwardly projecting lugs 123 by which the ring gear is held to the plate 39. The take off shaft 124 is journaled in the case 122, and it carries a gear 125 adapted to mesh with the ring gear 120. Preferably this gear 125 is splined on shaft 124 so it can be shifted completely out of mesh with ring gear 120. It is wide enough to mesh with the ring gear in all positions thereof. Obviously the gear 125 may be fixed on shaft 124 and be clutched and declutched to and from other elements.

It will be seen that the power take off is thus in series with the first gear set, and it may be driven at either high or low speed or in reverse. Obviously this same attachment may be added to the gear set shown in Fig. 4.

Attention is called to the fact that in the transmission shown in Fig. 1, the gear reduction, i. e., low direct drive, might be omitted without departing from my invention. Also the second epicyclic gear set might be put in advance of the first as shown in Fig. 1, but there is a peculiar advantage in the arrangement.

I do not intend to be limited to the details shown or described.

I claim:—

1. In combination, a driving shaft, a driving pinion thereon, a driven shaft in line with the driving shaft, a cage about the driving pinion having idlers therein meshing with the driving pinion, said cage having a sleeve bearing on the driving shaft, a stationary bearing supporting the sleeve, a slidable sleeve keyed on the driven shaft, a stationary bearing outside the said sleeve, an internal gear member meshing with the idlers, a clutch element mounted on said latter sleeve, and control means including means for clutching said clutch element to either the cage or the internal gear, or both.

2. In combination, a driving shaft having a pinion, a cage about the pinion having idlers meshing with the pinion, an internal gear meshing with the idlers and slidable endwise, a spring pressed common clutch element for clutching either the cage or the internal gear to the driven shaft, said clutch element being controlled by movement of the internal gear, a stationary frame having bearings for the driving and the driven shafts, a shiftable control element for shifting the internal gear, clutch means on the frame member for clutching the internal gear, and means controlled by the shiftable element for clutching the cage to the frame.

3. In combination, a driving shaft having a pinion, a driven shaft in line therewith, said driven shaft having a clutch element mounted thereupon, a cage member having a bearing sleeve on the driving shaft and having a pin piloted in the driven shaft, a stationary frame having bearings embracing the driven shaft and the sleeve to support the driving shaft, the cage and the driven shaft, said cage having idlers meshing with the pinion, an internal gear supported on the idlers and meshing therewith, and controlling means for said clutch element and the gear, said controlling means including means to clutch the cage to the driven shaft or to hold the same rigid with the frame.

4. In combination, a driving shaft having a pinion, a cage having idlers meshing therewith, a driven shaft in line with the driving shaft, said cage having a sleeve mounted on the driving shaft, and a pin piloted in the driven shaft, a stationary frame having a bearing embracing said sleeve, a spring pressed clutch member mounted on the driven shaft and adapted normally to clutch the driven shaft to the cage, an internal gear mounted on and meshing with the idlers, said internal gear having clutch means at each end thereof, means for axially shifting the internal gear, and means controlled by said control means for clutching the cage to the frame.

5. In combination, a driving shaft, a driven shaft in line therewith, the driving shaft having a pinion, a cage having idlers meshing with the pinion, said cage being piloted in the driven shaft and having a sleeve bearing on the driving shaft, a stationary frame member having a bearing embracing said sleeve, said pinion and idlers lying on one side of said bearing, an internal gear meshing with the idlers, cooperating clutch means on the internal gear, the cage and the driven shaft, clutch means on said sleeve lying on the other side of said bearing for clutching said sleeve and thereby the cage to the frame member, and control means for said gear.

6. In combination, a frame comprising a wall, a bearing in said wall, a shaft passing through the wall and having a pinion lying on one side of the wall, a cage embracing the pinion, said cage having a bearing sleeve embracing said shaft and extending through the bearing in said wall to the other side of the wall, a clutch disc on said sleeve on said other side of the wall, pinions having bearings in the cage and meshing with said pinion, an internal ring gear meshing with the pinions, clutch means for said ring gear, a shifter rod having means for operating said clutch means on one side of the wall and having clutch means for clutching the said clutch disk on the other side of the wall.

7. In combination, a frame comprising a housing, a shaft having a pinion, a cage embracing said pinion and mounting idlers meshing with the pinion, an internal gear meshing with the idlers, said cage having an extended bearing sleeve embracing the shaft and bearing thereupon, a rotatable clutch member secured to the remote end of said sleeve, shiftable clutch means for engaging said clutch member, a wall forming a part of the frame lying between said cage and said clutch member and a bearing in said wall embracing said sleeve.

In witness whereof, I hereunto subscribe my name this 8th day of January, 1927.

THOMAS L. FAWICK.